Figure 1:
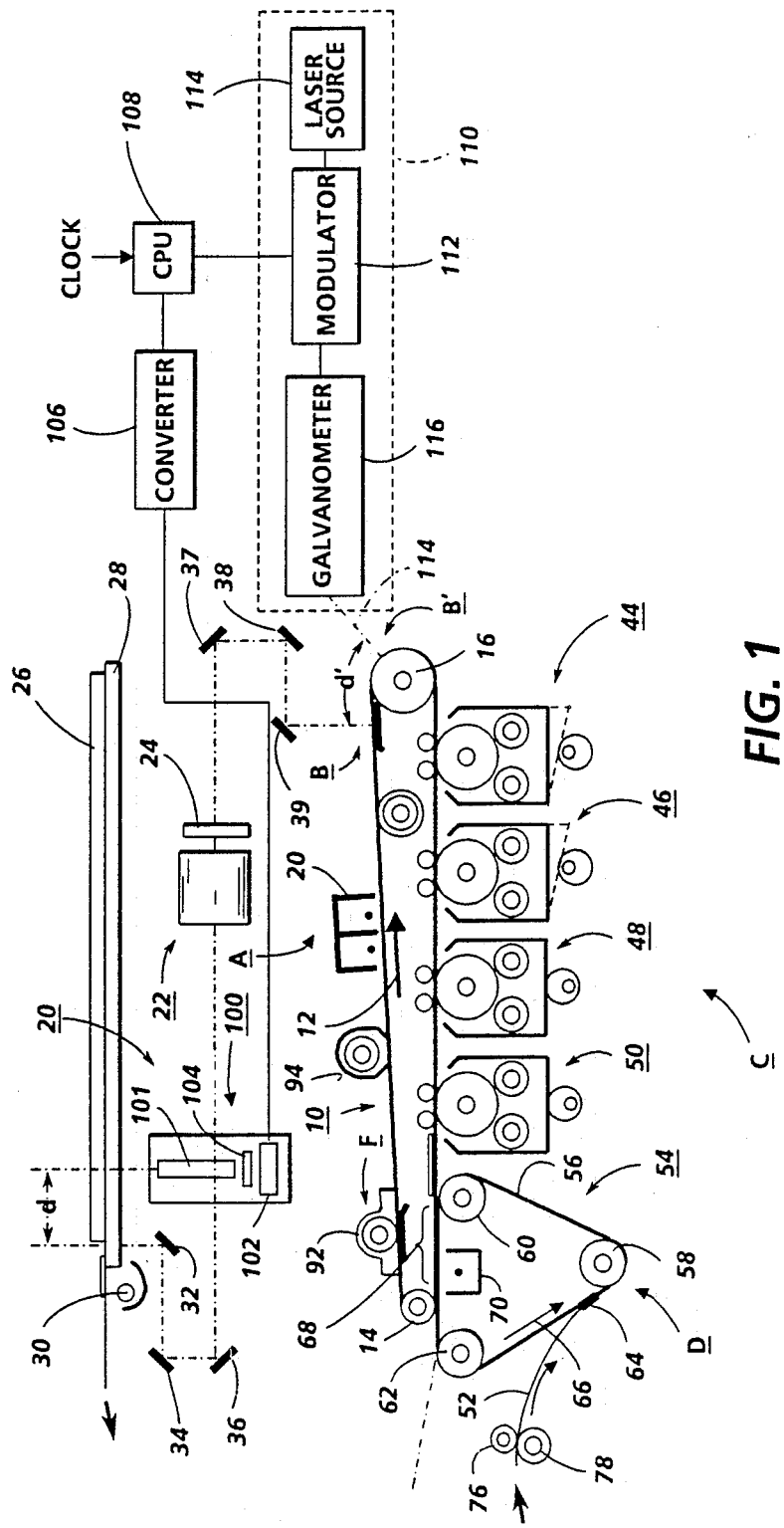

United States Patent [19]

Rees et al.

[11] Patent Number: 4,967,265
[45] Date of Patent: Oct. 30, 1990

[54] COLOR CORRECTION SYSTEM FOR AN ELECTROPHOTOGRAPHIC COPYING MACHINE

[75] Inventors: James D. Rees, Pittsford; Richard F. Lehman, Webster; Kenneth R. Ossman, Macedon, all of N.Y.

[73] Assignee: Xerox Corporation, Stamford, Conn.

[21] Appl. No.: 332,821

[22] Filed: Apr. 4, 1989

[51] Int. Cl.$^5$ ............................................. H04N 1/46
[52] U.S. Cl. ...................................... 358/75; 358/80
[58] Field of Search ................................. 358/80, 75

[56] References Cited

U.S. PATENT DOCUMENTS

| | | | |
|---|---|---|---|
| 4,236,809 | 12/1980 | Kermisch | 355/4 |
| 4,305,094 | 12/1981 | Yamada | 358/80 |
| 4,480,257 | 10/1984 | Hill | 346/108 |
| 4,580,889 | 4/1986 | Hiranuma et al. | 358/75 |
| 4,677,465 | 6/1987 | Alkofer | 358/80 |
| 4,679,073 | 7/1987 | Hayashi | 358/75 |
| 4,745,466 | 5/1988 | Yoshida | 358/80 |
| 4,748,680 | 5/1988 | Margolin | 358/75 |
| 4,791,450 | 12/1988 | Mosehauer et al. | 358/75 |
| 4,814,797 | 3/1989 | Haneda et al. | 358/80 |

OTHER PUBLICATIONS

"Principles of Color Reproduction" by J. A. C. Yule, pp. 41–45, John Wiley Publishers 1967.

Primary Examiner—Edward L. Coles, Sr.
Assistant Examiner—Jerome Grant, II

[57] ABSTRACT

A color correction system for a color copier is enabled by means of a low resolution RIS unit attached to a light/lens scan system which creates an electronic raster image simultaneously with formation of a color latent image. The RIS output signals are used to modulate the output of a ROS unit which exposes the color latent image to a modulated color correction pattern. Color developer units are enabled to successively develop each color.

1 Claim, 1 Drawing Sheet

COLOR CORRECTION SYSTEM FOR AN ELECTROPHOTOGRAPHIC COPYING MACHINE

BACKGROUND AND PRIOR ART STATEMENT

This invention relates generally to a multi-color electrphotographic copying machine and, more particularly, to a digitally assisted, color correction system incorporated in the copying machine.

In an electrophotographic copying machine, a photoconductive member is charged to a substantially uniform potential to sensitize the surface thereof. The charged portion of the photoconductive member is exposed to a light image of an original document being reproduced. Exposure of the charged photoconductive member selectively dissipates the charge thereon in the irradiated areas. This records an electrostatic latent image on the photoconductive member corresponding to the informational areas contained within the original document being reproduced. After the electrostatic latent image is recorded on the photoconductive member, the latent image is developed by bringing marking particles into contact therewith. This forms a powder image on the photoconductive member which is subsequently transferred to a copy sheet. The copy sheet is heated to permanently affix the marking particles thereto in image configuration.

Multi-color electrophotographic printing is similar to the foregoing process of black and white printing. However, rather than forming a single latent image on the photoconductive surface, successive latent images corresponding to different colors separation (red, green, blue) are recorded thereon. Each single color electrostatic latent image is developed with toner particles of a color complementary thereto; (cyan, magenta, yellow, respectively). This process is repeated a plurality of cycles for differently colored images and their respective complimentarily colored toner particles. Each single color toner powder image is transferred to the copy sheet in superimposed registration with the prior toner powder image. This creates a multi-layered toner powder image on the copy sheet. Thereafter, the multi-layered toner powder image is permanently affixed to the copy sheet creating a color copy.

To improve the accuracy of the color rendition, some type of color correction is usually required. Color correction is primarily required because the colored toner absorbs light of various colors which should not be absorbed e.g. magenta toner may absorb some blue light which should only be absorbed by yellow toner. One method of color correction is known from the lithographic art and is described in the "Principles of Color Reproduction" by J. A. C. Yule, John Wiley Publishers 1967 pages 41-45. One of the methods described uses a masking technique in which a positive or negative image made with one filter is combined with a negative or positive image (usually an image of the opposite sign) made with a different filter. A color correction technique known in the xerographic art is disclosed in U.S. Pat. No. 4,236,809. There an original is scanned using a conventional light lens analog scanning system while simultaneously sensing the scanned incremental image at a plurality of photosensor arrays (digital raster scanning). The raster signals are applied to a raster output scanner to expose the drum to a light image represented by the raster signals. The raster output scanner includes a laser that generates a narrow beam of light which is focused to a spot on the drum. A mirror mounted on a galvanometer sweeps the laser spot across the drum at a high speed relative to the drum peripheral movement. An optical modulator in the path of the laser beam modulates the intensity of the spot in response to the raster signals to produce a raster latent electrostatic image on the drum.

The analog and digital raster images are formed on the photoconductive drum during the same revolution and in conjunction with a screening process. The two images are in registration. The raster image is a low resolution (approximately 100 spi) correction image for the high resolution (approximately 400 spi) optical image. The resultant latent image is of a significantly enhanced quality relative to that achieved solely with the optical exposure means alone. In the case of a color copying machine, the combined optical and raster exposure means permits the machine to make good color copies of colored originals.

The color correction system disclosed in the '809 patent had several disadvantages. Three separate photosensor arrays with three associated lenses and filters are required. This leads to increased housing requirements and additional expense. Also the output of the RIS must be stored in buffers before processing the image signals to convert the raster video signals to an image correction signal. The present invention is therefore directed to an improved, low resolution, marking color correction system which incorporates a simplified RIS system which requires no buffering to provide the image correction including; a platen for supporting a colored original to be reproduced; scan illumination means mounted for movement beneath said platen; imaging means for forming successive latent images corresponding to different colors of said document on the charged surface of a photoconductive member and raster input scanning means connected to said scan illumination member and adapted for movement therewith, said RIS adapted to generate raster image signals representative of color separated images of the original document being scanned by said scan means.

IN THE DRAWINGS

FIG. 1 is a schematic elevational view depicting an electrophotographic copying machine incorporating the color correction system of the present invention.

For a general understanding of the features of the present invention, reference is made to FIG. 1 which schematically depicts the various components of an illustrative electrophotographic copying machine incorporating the color correction system of the present invention therein. It will become evident from the following discussion that the color correction system of the present invention is equally well suited for use in a wide variety of electrostatographic copying machines, and is not necessarily limited in its application to the particular machine shown herein.

Inasmuch as the art of electrophotographic copying is well known, the various processing stations employed in the figure will be shown hereinafter schematically and their operation described briefly with reference thereto.

As shown in the figure, the electrophotographic printing machine employs a photoconductive belt 10. Belt 10 moves in the direction of arrow 12 to advance successive portions of the photoconductive surface sequentially through the various processing stations disposed about the path of movement thereof. Belt 10 is entrained about roller 14 and drive roller 16. Roller 14 is mounted so as to rotate with belt 10. Drive roller 14 is rotated by a motor coupled thereto by suitable means such as a belt drive. As roller 14 rotates, it advances belt 10 in the direction of arrow 12. Initially, a portion of photoconductive belt 10 passes through charging station A. At charging station A, two corona generating devices, indicated generally by the reference numerals 18 and 19, charge photoconductive belt 10 to a relatively high, substantially uniform potential. Corona generating device 18 places all of the required charge on photoconductive belt 10. Corona generating device 19 acts as a leveling device, and fills in any areas missed by corona generating device 18.

Next, the charged photoconductive surface is rotated to exposure station B. An optical analog image of the original document is formed at exposure station B by an optical system, generally designated by the reference numeral 20. An original document 26 is supported upon a transparent viewing platen 28. Successive incremental areas of the document are illuminated by means of a moving lamp assembly, shown generally by the reference numeral 30. Mirrors 32, 34 and 36 reflect the light rays through lens 22. Lens 22 is adapted to scan successive areas of illumination reflected from platen 28. The light rays from lens 22 are transmitted through filter assembly 24 and then reflected by mirrors 37, 38 and 39 to be focused on the charged portion of photoconductive belt 10. Lamp assembly 30, mirrors 32, 34 and 36, lens 22 and color filter assembly 24 are moved in a timed relationship with respect to the movement of photoconductive belt 10 to produce a flowing light image of the original document on photoconductive belt 10 in a non-distorted manner. Prior to each exposure, filter assembly 24 interposes selected color filters 24A (red), 24B (green) and 24C (blue) into the optical light path of lens 22. The color filters operate on the light rays passing through the lens to record an electrostatic latent image, i.e. a latent electrostatic charge pattern, on the photoconductive belt corresponding to a specific color separation of the flowing light image of the original document.

Subsequent to the recording of the electrostatic, latent image on photoconductive belt 10, belt 10 advances the electrostatic latent image to exposure station B' where a digital raster correction light pattern is applied to the latent image already formed at exposure station B, as will be described in further detail below. The color-corrected latent image is then advanced to development station C. Development station C includes four individual developer units generally indicated by the reference numerals 44, 46, 48 and 50. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer particles are continually moving so as to provide the brush consistently with fresh developer material. Development is achieved by bringing the brush of developer material into contact with the photoconductive surface. Each of the development units 44, 46 and 48, respectively, apply toner particles of a specific color which corresponds to the compliment of the specific color separated electrostatic latent image recorded on the photoconductive surface.

The color of each of the toner particles is adapted to absorb light within a preselected spectral region of the electromagnetic wave spectrum corresponding to the wave length of light transmitted through the filter. For example, an electrostatic latent image formed by passing the light image through a green filter will record the red and blue portions of the spectrum as areas of relatuvely high charge density on belt 10 while the green light rays will pass through the filter and cause the charge density on the photoconductive belt 10 to be reduced to a voltage level ineffective for development. The charged areas are then made visible by having developer unit 44 apply green absorbing (magenta) toner particles onto the electrostatic latent image recorded on photoconductive belt 10. Similarly, a blue separation is developed by developer unit 46 with blue absorbing (yellow) toner particles, while the red separation is developed by developer unit 48 with red absorbing (cyan) toner particles. However, and as discussed above, the toner absorption properties are imperfect requiring the color correction techniques to be described below. Developer unit 50 contains black toner particles and may be used to develop the electrostatic latent image formed from a black and white original document. Each of the developer units is cammed into and out of the operative position by means not shown. In the operative position, the magnetic brush is closely adjacent the photoconductive belt, while, in the inoperative position, the remaining developer units are in the inoperative position. This insures that each electrostatic latent image is developed with toner particles of the appropriate color without co-mingling. One skilled in the art will appreciate that while the developer units have been described as using a dry developer material, i.e. toner particles, a liquid may be employed. The term "toner image" is intended to cover both an image developed with a dry developer material or a liquid developer material.

After development, the toner image is moved to transfer station D where the toner image is transferred to a sheet of support material 52, such as plain paper. At transfer station D, the sheet transport apparatus of the present invention, indicated generally by the reference numeral 54, moves sheet 52 into contact with photoconductive belt 10. Sheet transport 54 has a pair of spaced belts 56 entrained about three rolls 58, 60 and 62. A gripper 64 extends between belts 56 and moves in unison therewith. Sheet 52 is advanced from a stack of sheets (not shown) into the nip defined by forwarding rollers 76 and 78. Forwarding rollers 76 and 78 advance sheet 52 to sheet transport 54. Sheet 52 is advanced by forwarding rollers 76 and 78 in synchronism with the movement of gripper 64. In this way, the leading edge of sheet 52 arrives at a preselected position to be received by the open gripper 64. The gripper then closes securing the sheet thereto for movement therewith in a recirculating path. The leading edge of the sheet is secured releasably by gripper 64. As the belts move in the direction of arrow 66, the sheet 52 moves into contact with the photoconductive belt, in synchronism with the toner image developed thereon, at the transfer zone 68. A corona generating device sprays ions onto the backside of the sheet so as to charge the sheet to the proper magnitude and polarity for attraction the toner image from photoconductive belt 10 thereto. Sheet 52 remains secured to gripper 64 so as to move in a recirculating path for three cycles. In this way, three different color toner images are transferred to sheet 52 in superimposed registration with one another. Thus, the aforementioned steps of charging the photoconductive surface, exposing the photoconductive surface to a specific color of the flowing light image of the original document, developing the electrostatic latent image recorded on the photoconductive surface with appropriately colored toner, and transferring the toner images to the sheet of support material are repeated a plurality of cycles to form a multi-color copy of a colored original document.

After the last transfer operation, grippers 64 open and release sheet 52. Sheet 52 is transported to a fusing station (not shown) where the transferred image is permanently fused to sheet 52.

The last processing station in the direction of movement of belt 10, as indicated by arrow 12 is cleaning station F. A rotatable mounted fibrous brush 92 is positioned in cleaning station F and maintained in contact with photoconductive belt 10 to remove residue toner particles remaining after the transfer operation. Thereafter, lamp 94 illuminates photoconductive belt 10 to remove any residual charge remaining thereon the prior to the start of the next successive cycle. All of the above described system function are under the control of a central processing unit 108 which for example may be a model 8086 made by Intel Corporation.

Turning now to the description of the color correction technique of the present invention, the digital raster correction light patterns at exposure station B' are formed by signals from a raster output scan (ROS) unit 110 by signals from raster input scan (RIS) unit 100. Referring to the FIG. 1, RIS unit 100 includes a linear gradient index lens array 101 which, in a preferred embodiment is a SLA12 SELFOC TM lens made by Nippon Sheet GLASS Company. Lens array 101 is mechanically connected to moving lamp assembly 30 and is adapted to scan document 26 simultaneously with the scanning motion of assembly 30. It is noted that the center line of lens array 40 is separated from the principal ray reflected from mirror 32 by distance d. Array 101 projects incremental images of the original onto a full width sensor array 102 through a filter assembly 104. Array 102 is a 100spi sensor array similar to arrays manufactured by Toshiba and Fuji Xerox. Filter assembly 104 comprises a red filter 104A and a green filter 104B, both pivotable into and out of the optical path.

During a first exposure cycle, a full latent electrostatic image of the original corresponding to a specific color separation is formed on the belt surface by the light lens scanning system. Simultaneously, the combination of the lens array 101, and photosensor array 102 in RIS unit 100 result in electrical raster signals being generated in line by line fashion that collectively represent a full raster image of the entire original. Then the RIS signals are processed and sent to ROS unit 110, described in further detail below, which exposes the latent image to a color correction light pattern corresponding to the RIS signals. According to the invention, buffering of the RIS signals is not required because of the first order of the color correction filtering mechanism used. In operation, it is assumed that during a first exposure cycle, to form a red seperation image to be developed by the cyan toner, filter mechanism 24 interposes a red filter 24A into the optical light path of lens 22. RIS red filter 104A and RIS green filter 104B, are pivoted out of the optical path. Typically, no color correction is supplied to these red seperation image so the red latent image is not subjected to a ROS correction signal and is developed by developer unit 48 with red absorbing (cyan) toner.

For the blue and green separations, color correction signals are at predetermined levels to compensate for the imperfect cyan toner absorption. On the second exposure cycle, green filter 24B is interposed into the optical path of lens 22. Red filter 104A is interposed between the output of lens array 101 and photosensor array 102, generating a first series of RIS correction signals. The RIS signals are converted into digital signals by convertor 106 and processed by controller 108 which sends output signals to ROS unit 110. Unit 110 comprises a modulator 112, laser source 114 and a galvanometer 116. The timing of the output signals to modulator 112 is controlled by a clock signal which controls system functions and which includes a componet representing the distance d separating the lens array 101 from mirror 32. This timing signal insures that the color correction is in exact registration with the color latent image formed along the light lens path. The actual color correction is thus produced by a laser beam of source 114 which has been modulated by the output signals from CPU 108 which in turn control the deflction of galvonometer 116 which scans the modulated signal across the drum surface at exposure station B'.

The corrected second, green image is developed by developer unit 44 with green absorbing (magenta) toner. The correction signal will correct for the imperfect absorption of the cyan toner. Similarly, on the third exposure cycle, blue filter 24C is interposed in the light lens path and green filter 104B is interposed in the RIS path. Th correction signal will correct for the imperfect absorption of the cyan and magenta toners. The corrected blue separation image is developed by developer unit 46 with blue absorbing (yellow) toner.

While the invention has been described with reference to the structure disclosed, it is not confined only to the specific details set forth. For example, while a galvanomemter has been used as the mechanism for scanning the correction object pattern at exposure station B' a polygon scanner could be established. As another example, instead of the colored filter assembly, a color CCD sensor having a inherent filtering function such as a TOSHIBA TD11 OBC could be used. It is intended to cover such modifications or changes as may come within the scope of the following claims:

What claimed is:

1. An electrophotographic copying apparatus utilizing a raster input scanner (RIS) for color correction, the apparatus including a platen in a horizontal plane for supporting a colored original to be reproduced; scan/illumination means mounted for movement beneath said platen; imaging means coupled to said scan/illumination means and adapted for movement therewith for forming successive latent images corresponding to different color separations of said document on the charged surface of a photoconductive member at a first exposure station, said RIS coupled to said scan illumination means, and adapted for movement therewith so as to scan said document simultaneously with said imaging means, said apparatus further including control means adapted to transmit a modulated color correction light pattern in registration onto each color laten image formed by said imaging means at a second exposure station, said control means including means for processing output signals from said RIS and for applying control signals to a raster output scanner which generates the modulated color corrected output signal.

* * * * *